B. F. COPP.
Improvement in Wheel-Borers and Key-Way Cutters.
No. 115,824.             Patented June 13, 1871.
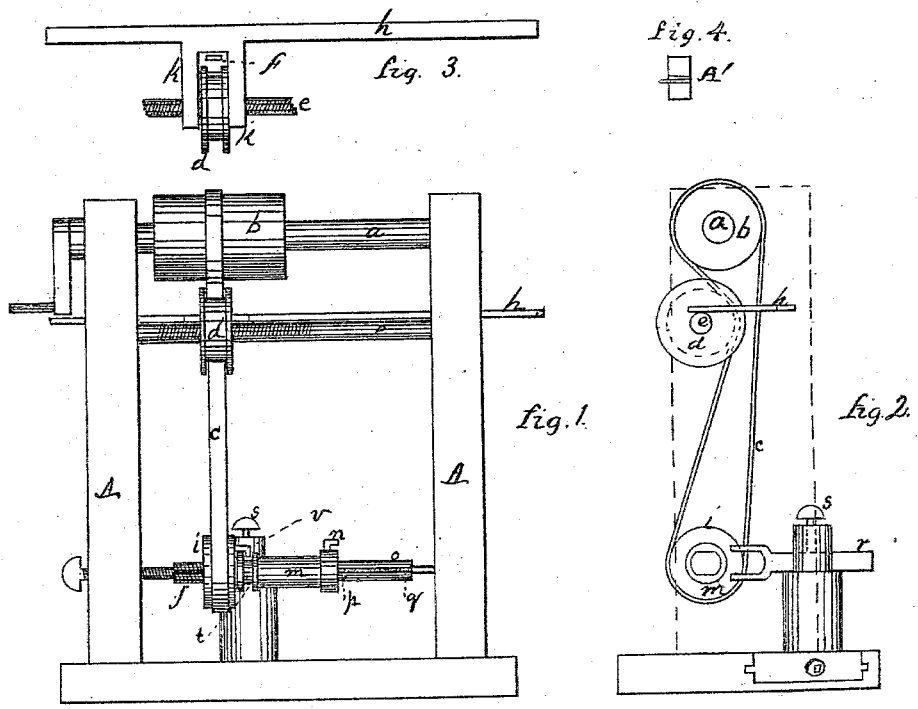

UNITED STATES PATENT OFFICE.

BENJAMIN F. COPP, OF WEST CUMBERLAND, MAINE.

IMPROVEMENT IN WHEEL-BORERS AND KEY-WAY CUTTERS.

Specification forming part of Letters Patent No. 115,824, dated June 13, 1871.

*To all whom it may concern:*

Be it known that I, BENJAMIN F. COPP, of West Cumberland, in the county of Cumberland and State of Maine, have invented a new and useful Wheel-Borer and Key-Way Cutter; and I do hereby declare the following to be a full, clear, and exact description thereof, reference being had to the accompanying drawing, in which—

Figure 1 is a front elevation. Fig. 2 is an end view. Fig. 3 is a detail of the friction-pulley. A' is a view of the keyed borer.

My invention relates to certain improvements upon an ordinary lathe, so that it can be advantageously used for boring wheels like car-wheels, and for cutting key-ways in the same.

$a$ shows a rotating shaft, upon which is placed the drum $b$. Around this drum passes the band $c$, one side passing over a portion of the friction-pulley $d$ on the shaft $e$. The pulley $d$ has a female screw working on the thread on the said shaft $e$. The band $c$ also passes down through the slot $f$ in the sliding guide $h$, and then around the pulley $i$ on the stock $j$. The slide $h$ has the two projecting pieces $k$ $k'$, between which is placed the pulley $d$.

As the shaft $a$ and drum $b$ are revolved, the pulley $d$ is at the same time rotated by the band $c$, and so moves forward on the screw-thread on the shaft $e$, carrying with it the slide and the band where it passes around the drum $b$. The purpose of this is that the band may follow the cutter-head $m$ of the lathe as it advances on the stock when cutting, for instance, a key-way. $n$ shows the key-way cutter set into the cutter, which is placed on the arbor. The cutter-head has a small pin, $p$, fitting the slit $q$ in the arbor to control and guide the motion of the head. The wheel, for instance, being placed in the lathe, the cutter is properly set, and power then applied to the drum $b$, when the head $m$ advances, carrying the cutter through the hole, and so repeating the operation until the way is cut.

With my improvement the lathe can be employed for boring car and other heavy wheels. A' shows the cutter set into the head by means of a dovetailed key and a flaring slot. When the lathe is thus employed, the cutter-head is attached directly to the feed-post or carriage by means of the horizontal fork $r$, at which time, of course, the drum $b$, band $c$, and pulley $d$ are not used, the head $m$, as is usual, being stationary. The fork $r$ is set into the feed-post, and held by the tightening-screw $s$. The bifurcations fit into the groove $t$ so as to hold the cutter-head. The tool-post is set into a carriage moving or sliding in a way, and operated by a screw, as shown in the drawing. The cutter $n$ being removed, and the borer $a$ being set into the head, and the wheel to be bored being set on the face-plate and placed on the stock, it is set in rotation, and can then be bored on the lathe with much increased rapidity.

It will be perceived that by swinging the stock and head a hole can be bored at any desired angle.

When the lathe is used to cut a key-way the head is connected with the pulley $i$ by means of the pin $v$ set into the pulley and moving around on the head in the groove $t$.

The cutter-head is not revolved, but is advanced by the feed-post when a wheel is to be bored, and by the pulley $i$ when a key-way is to be cut.

The wheels, being cast with a hole at the center, are placed upon the stock and set in revolution, being attached to the face-plate in the ordinary way.

When the key-way cutter is used, as fast as the cutter has removed a clipping, the cutter is drawn back, is again advanced, and another clipping removed, as before.

I do not intend to embrace in my invention holding a drill stationary by means of a hand-wrench, so that the drill shall not rotate with the work. Mine differs from this common device in that the tool, being connected with the feed-post, which advances with it, is held during the operation of boring. I do not claim holding the tool by hand, or in any way whatsoever, except in the particular manner herein set forth.

What I claim as my invention, and desire to secure by Letters Patent, is—

1. The combination of the drum $b$, the pulley $d$, the screw-shaft $e$, band $c$, pulley $i$, head $m$, and threaded stock $j$, as herein described.

2. The combination of the sliding tool-post, fork $r$, sleeve $m$, cutter $n$, and mandrel $o$, arranged as described, for the purpose set forth.

BENJ. F. COPP.

Witnesses:
WM. H. CLIFFORD,
HENRY C. HOUSTON.